US012684419B2

(12) United States Patent
Thein et al.

(10) Patent No.: US 12,684,419 B2
(45) Date of Patent: Jul. 14, 2026

(54) METHODS AND APPARATUSES FOR RADIO COMMUNICATION

(71) Applicant: Robert Bosch GmbH, Stuttgart (DE)

(72) Inventors: Christoph Thein, Hildesheim (DE); Hugues Narcisse Tchouankem, Hemmingen (DE); Marie-Theres Suer, Braunschweig (DE); Oscar Dario Ramos Cantor, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 408 days.

(21) Appl. No.: 17/886,516

(22) Filed: Aug. 12, 2022

(65) Prior Publication Data

US 2023/0062946 A1 Mar. 2, 2023

(30) Foreign Application Priority Data

Aug. 26, 2021 (EP) ..................................... 21193153

(51) Int. Cl.
| | |
|---|---|
| *H04W 28/18* | (2009.01) |
| *H04L 41/147* | (2022.01) |
| *H04W 28/02* | (2009.01) |
| *H04W 40/18* | (2009.01) |

(52) U.S. Cl.
CPC ........... *H04W 28/18* (2013.01); *H04L 41/147* (2013.01); *H04W 28/0268* (2013.01); *H04W 40/18* (2013.01)

(58) Field of Classification Search
CPC . H04W 28/18; H04W 28/0268; H04W 40/18; H04W 28/24; H04W 4/40; H04W 24/02; H04L 41/147
See application file for complete search history.

(56) References Cited

U.S. PATENT DOCUMENTS

| | | | | |
|---|---|---|---|---|
| 2020/0260333 A1* | 8/2020 | Kousaridas | ............. | H04W 4/40 |
| 2021/0112441 A1 | 4/2021 | Sabella et al. | | |
| 2023/0388817 A1* | 11/2023 | Rydén | .................. | H04W 24/02 |
| 2023/0403606 A1* | 12/2023 | Lunardi | ................ | H04W 24/02 |
| 2024/0163734 A1* | 5/2024 | Kousaridas | ........... | H04W 28/24 |

FOREIGN PATENT DOCUMENTS

WO 2020060334 A1 3/2020

* cited by examiner

*Primary Examiner* — Omer S Mian
(74) *Attorney, Agent, or Firm* — NORTON ROSE FULBRIGHT US LLP

(57) ABSTRACT

An apparatus for radio communications. The apparatus includes: a processor to determine at least one parameter characterizing a present QoS at a first apparatus of a radio communications network; a processor to determine at least one first QoS prediction that characterizes a future QoS at the first apparatus at least on the at least one determined parameter; and a transmitter to transmit the at least one first prediction.

19 Claims, 4 Drawing Sheets

METHODS AND APPARATUSES FOR RADIO COMMUNICATION

CROSS REFERENCE

The present application claims the benefit under 35 U.S.C. § 119 of European Patent Application No. EP 21 19 3153.0 filed on Aug. 26, 2021, which is expressly incorporated herein by reference in its entirety.

FIELD

The present invention relates to advantages in radio communications.

SUMMARY

Certain problems of the related art may be solved by a method and an apparatus according to the present invention.

According to a first aspect of the present invention, there is provided a method that comprises: determining at least one parameter characterizing a present QoS at a first apparatus of a radio communications network; determining at least one first QoS prediction that characterizes a future QoS at the first apparatus based at least on the at least one determined parameter; and transmitting the at least one first prediction.

The prediction of quality of service of the communication is an important driver not only for automotive use cases but also for wireless-based industrial applications. Predicting the achievable communication performance helps the applications to proactively adapt its behavior in order to be able to satisfy the user experience even when the network performance is being affected. The prediction accuracy is linked to the variety and quality of network information. The first prediction provides a future estimate of the QoS derived in a distributed manner.

According to an advantageous example embodiment of the present invention, the method comprises: receiving or determining at least one reference time indicator characterizing at least one point in time to which the at least one first QoS prediction is related.

The reference time indicator advantageously defines the time frame in which the first QoS prediction is valid.

According to an advantageous example embodiment of the present invention, the at least one first QoS prediction is further determined based on the first reference time indicator.

Advantageously, the QoS prediction is made available according to the present network requirements expressed by the reference time indicator.

According to an advantageous example embodiment of the present invention, the at least one first QoS prediction is transmitted along with the first reference time indicator.

Advantageously, the receiver is of knowledge of the validity of the received QoS prediction. After validity lapses, the receiver may discard the QoS prediction.

According to a second aspect of the present invention, an apparatus is provided that comprises: determining means to determine at least one parameter characterizing a present QoS at a first apparatus of a radio communications network; determining means to determine at least one first QoS prediction that characterizes a future QoS at the first apparatus based at least on the at least one determined parameter; and transmitting means to transmit the at least one first prediction.

According to a third aspect of the present invention, there is provided a method that comprises: receiving at least one first QoS prediction that characterizes a QoS at a first apparatus of a radio communications network; determining at least one parameter characterizing a present QoS at a second apparatus of the radio communications network; and determining at least one second QoS prediction that characterizes a future QoS at the second apparatus based on the received at least one first QoS prediction and based on the at least one determined parameter.

The prediction of quality of service of the communication is an important driver not only for automotive use cases but also for wireless-based industrial applications. Predicting the achievable communication performance helps the applications to proactively adapt its behavior in order to be able to satisfy the user experience even when the network performance is being affected. The prediction accuracy is linked to the variety and quality of network information. The second prediction provides a future estimate of the QoS derived in a distributed manner. In other words, a distributed QoS prediction is provided with reduced signaling overhead.

According to an example embodiment of the present invention, advantageously, each entity can use the predicted state in form of the first QoS prediction of the other entities to either estimate the confidence of its own prediction and can use the predicted states of the other entities as an input for its own prediction. The prediction reliability is improved.

In the case that apparatus acts as a central entity, prediction reliability is increased with less information exchange compared to a central entity, which requires a transmission of the local parameters from the linked entities.

According to an advantageous example embodiment of the present invention, the method comprises: receiving a plurality of first QoS predictions that characterize a future QoS at a respective one of first apparatuses.

Advantageously, the accumulation of QoS predictions provides knowledge of the QoS in parts or the whole radio communications network.

According to an advantageous example embodiment of the present invention, the method comprises: transmitting the at least one second QoS prediction.

According to an advantageous example embodiment of the present invention, the method comprises: determining at least one confidence level associated with the at least one second QoS prediction based on the received at least one first received QoS prediction.

Advantageously, the confidence level enables the apparatus to autonomously judge over the QoS situation in the network.

According to an advantageous example embodiment of the present invention, the method comprises: triggering a further determination of the at least one second QoS prediction if the determined confidence level is below a confidence threshold.

Therefore, the prediction reliability and trust in the second QoS prediction are improved. According to an advantageous example embodiment of the present invention, the method comprises: triggering an action, for example starting operation of a service that communicates with at least one service served by another apparatus of the radio communications network, in dependence on the second QoS prediction, for example if the determined confidence level is above an action threshold.

The triggered action benefits from the prediction as the action/application is able to prepare for a future service quality indicated by the QoS prediction.

According to an advantageous example embodiment of the present invention, the method comprises: transmitting a reference time indicator related to at least one point in time and causing the receiving apparatus to determine the at least one first QoS prediction referring to the at least one point in time.

Advantageously, the reference indicator is provided by an entity that, for example, manages the reference time indicator for a group of apparatuses or a whole cell.

According to an advantageous example embodiment of the present invention, the first and second QoS prediction comprise a prediction of at least one of the following: a latency, a data rate, a packet loss rate.

According to a fourth aspect of the present invention, there is provided an apparatus that comprises: receiving means (i.e., a receiver) to receive at least one first QoS prediction that characterizes a QoS at a first apparatus of a radio communications network; determining means (i.e., determining device) to determine at least one parameter characterizing a present QoS at a second apparatus of the radio communications network; and determining means (i.e., a determining device) to determine at least one second QoS prediction that characterizes a future QoS at the second apparatus based on the received at least one first QoS prediction and based on the at least one determined parameter.

DETAILED DESCRIPTION OF EXAMPLE EMBODIMENTS

Figure 1:
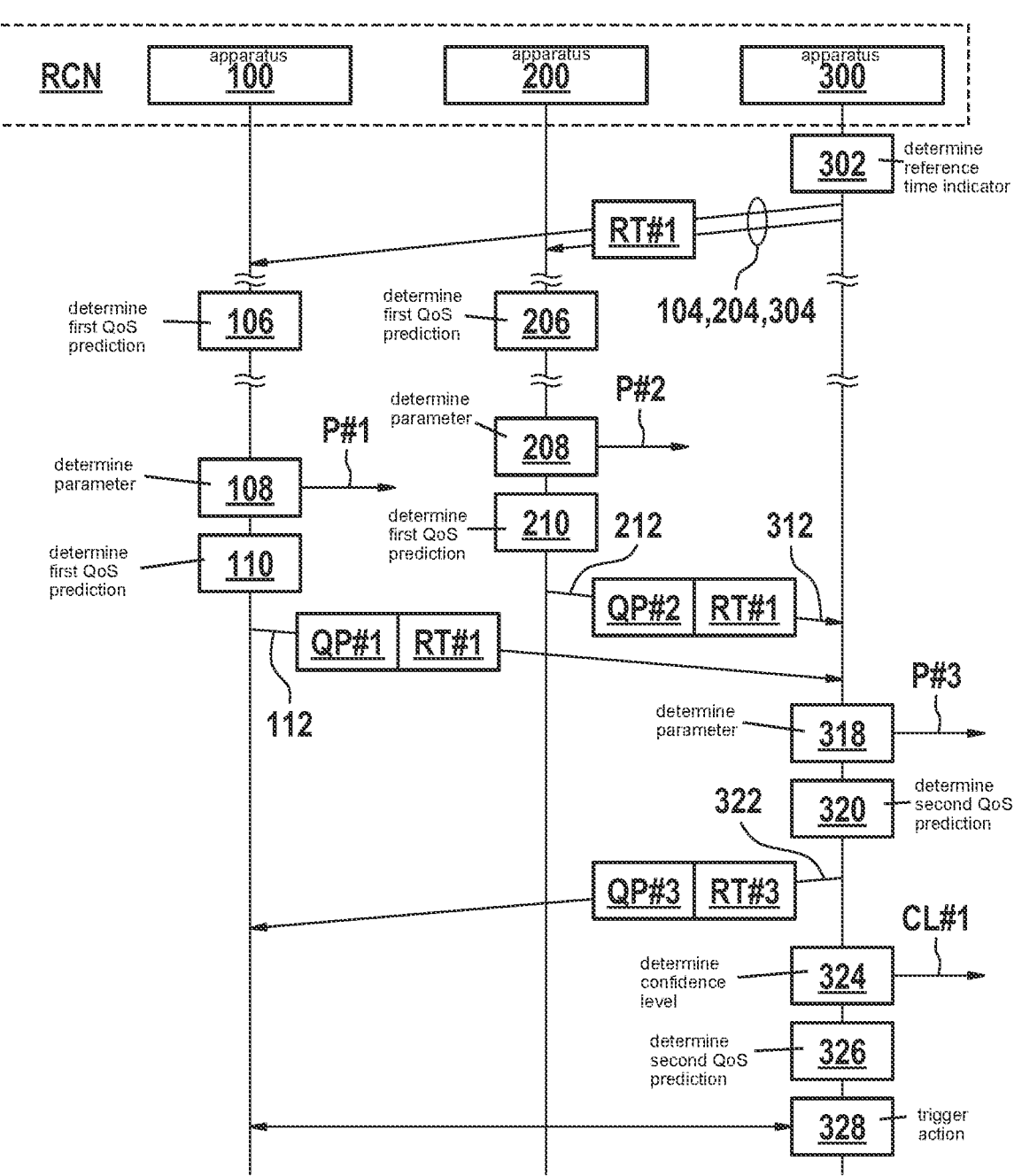
FIG. 1 depicts a schematic sequence diagram, according to an example embodiment of the present invention.

FIG. 1 depicts a schematic sequence diagram. Three apparatuses 100, 200, 300 are part of a radio communications network RCN.

Determining or processing means 302 are configured to determine a reference time indicator RT #1, which, for example, indicates a relative or absolute time reference, point in time or time interval.

Transmitting means (i.e., transmitter(s)) 304 are provided to transmit the reference time indicator RT #1 related to at least one point in time and causing the receiving apparatus 100, 200 to determine at least one first QoS prediction QP #1, QP #2 referring to the at least one point in time. Receiving means (i.e., receiver(s)) 104, 204 receive the at least one reference time indicator RT #1 characterizing at least one point in time or a time interval to which the at least one first QoS prediction QP #1, QP #2 is related.

Alternatively, the first QoS prediction QP #1, QP #2 is determined by determining or processing means 106, 206 locally.

Determining or processing means (i.e., processor(s)) 108, 208 determine at least one parameter P #1, P #2 characterizing a present QoS at a first apparatus 100, 200. Determining or processing means (i.e., processor(s)) 110, 210 determine at least one first QoS prediction QP #1, QP #2 that characterizes a future QoS at the first apparatus 100, 200 based at least on the at least one determined parameter P #1, P #2.

Transmitting means (i.e., transmitter(s)) 112, 212 transmit the at least one first prediction QP #1, QP #2.

According to an example, the at least one first QoS prediction QP #1 is further determined based on the first reference time indicator RT #1.

According to an example, the at least one first QoS prediction QP #1, QP #2 is transmitted along with the first reference time indicator RT #1. Alternatively or additionally Each of the apparatuses 100, 200 is fed by a subset of the information available for the prediction. The predicted states in form of the first QoS prediction QP #1, QP #2 of each apparatus 100, 200 are shared with the other entities or apparatuses 300.

The apparatus 300 comprises receiving means (i.e., receiver(s)) 312 to receive at least one first QoS prediction QP #1, QP #2 that characterizes a QoS at a first apparatus 100, 200 of a radio communications network RCN. Determining or processing means (i.e., processor(s)) 318 determine at least one parameter PIO characterizing a present QoS at a second apparatus 300 of the radio communications network RCN. Determining means 320 determine at least one second QoS prediction QP #3 that characterizes a future QoS at the second apparatus 300 based on the received at least one first QoS prediction QP #1, QP #2 and based on the at least one determined parameter P #3.

According to an example, receiving means 312 receive a plurality of first QoS predictions QP #1, QP #2 that characterize a future QoS at a respective one of apparatuses 100, 200.

According to an example, the determining or processing means (i.e., processor(s)) 320 determine a further reference time indicator RT #3 that is transmitted along with the second QoS prediction QP #3.

Transmitting means (i.e., transmitter(s)) 322 transmit the at least one second QoS prediction QP #3.

Determining or processing means (i.e., processor(s)) 324 determine at least one confidence level CL #1 associated with the at least one second QoS prediction QP #3 based on the received at least one first received QoS prediction QP #1, QP #2.

Triggering or processing means (trigger device(s) or processor(s)) 326 trigger a further determination of the at least one second QoS prediction QP #3 if the determined confidence level CIA' is below a confidence threshold.

Triggering or processing means (trigger device(s) or processor(s)) 328 trigger an action, for example starting operation of a service that communicates with at least one service served by another apparatus 100, 200 of the radio communications network RCN, in dependence on the second QoS prediction QP #2, for example if the determined confidence level CL #1 is above an action threshold.

According to an example, a client with two or more modems can decide to prefer for communication a modem with a QoS prediction indicating the fulfillment of the application requirements, instead of another modem with expected poor communication performance reported by the QoS prediction.

According to another example, the application on a server can decide to modify the application behavior, e.g. reduce the amount of data to be transmitted or delay the transmission of data to/from a client, in order to avoid errors in the communication if the QoS prediction indicates bad communication performance.

The first and second QoS prediction QP #1-3 comprise a prediction of at least one of the following: a latency, a data rate, a packet loss rate.

The local parameters P #1-3 comprise at least one of the following: a received signal strength indicator, RSSI; a number of users in the radio communications network, a number of utilized radio resources, a latency deadline, a reliability indicator, a data rate.

According to an example, a goal is to enhance the quality of prediction mechanisms at third-parties by exchanging dedicated information with different detail levels among parties e.g. network operator, client owner. By doing so, the prediction accuracy could be increased and, in some instances might lower the prediction confidence interval as incomplete or erroneous network information could be sorted out in advance or/and efficiently threated during the prediction task.

One example of the dedicated information is the number of users in the radio communications network. The network knows this dedicated information, since the users need to be registered, but in practice, it is not known at each single client (at least not in a straightforward fashion). Moreover, the "activity profiles" of the users are monitored by the network in order to e.g., predict the expected data rate per user in the near future.

The network can provide the information of connected users and their profiles to the clients for their own prediction of latency, but this demands extra signaling. In contrast, the network can provide the dedicated information in form of an "abstract" prediction of data rate for a particular user, which can be used by that user in order to validate and/or fine-tune its own prediction.

Figures 2, 3:
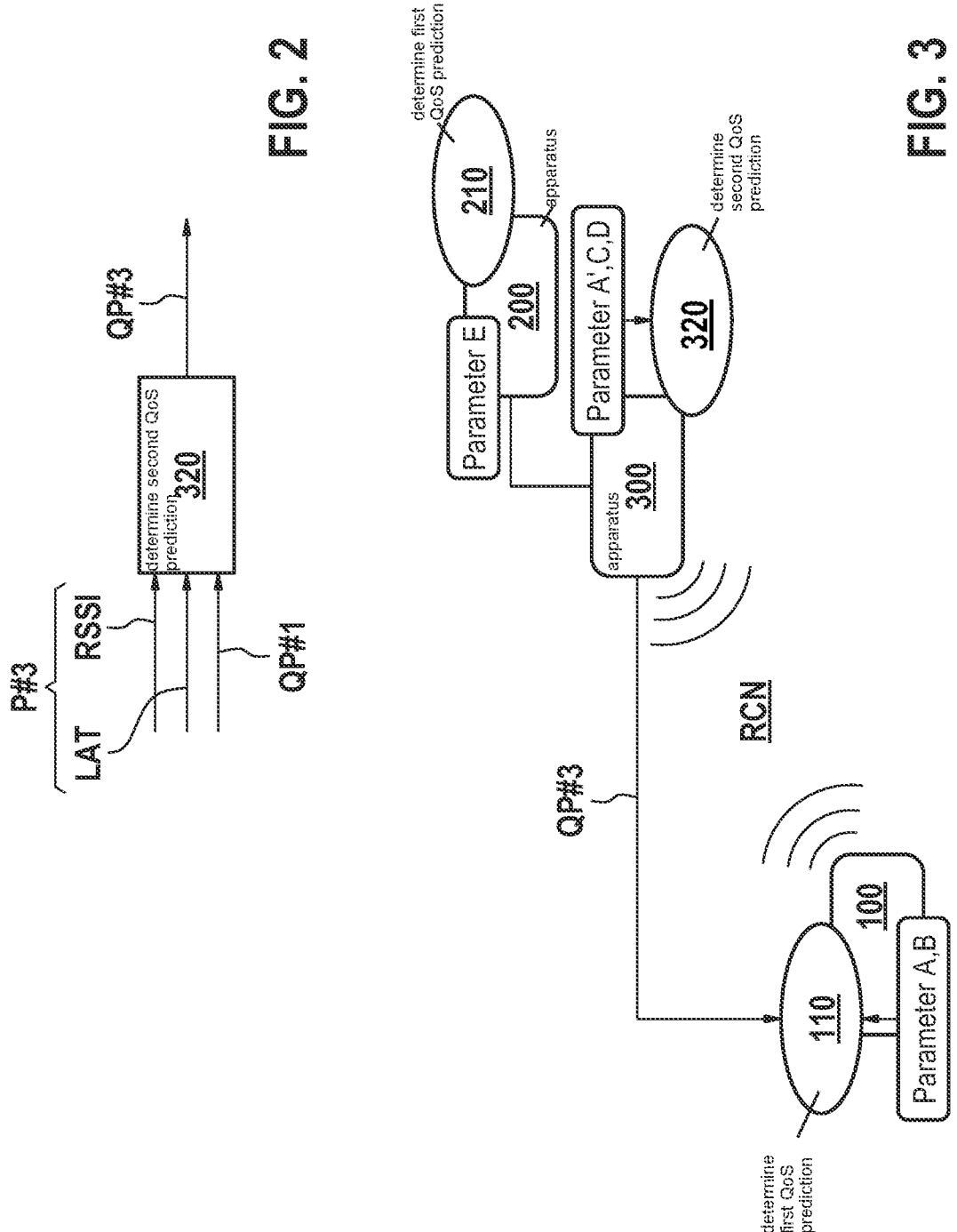
FIG. 2 depicts schematically a predictor unit, according to an example embodiment of the present invention.
FIGS. 3 to 5 each depict schematically an architecture of a radio communications network, according to example embodiments of the present invention.

FIG. 2 depicts schematically the determining means 320 for determining the QoS prediction QP #3. The determining means 320 is fed with a received signal strength, RSSI, and a measured latency LAT which are parameters PIO. Furthermore, the determining means 320 receives the QoS prediction QP #1 related to at least one first point in time from another apparatus. The determining means 320 determines the QoS prediction QP #3 based on the input. The determining means 320 comprise an artificial neural network or another function like a mapping.

FIG. 3 depicts schematically an exemplary architecture, where three apparatuses 100, 200, 300 can communicate with each other. A client in form of the apparatus 100 communicates wirelessly with the radio communications network in form of the apparatus 300, to which a server in form of the apparatus 200 is connected.

At each of the above mentioned entities, i.e. client, wireless network and server, it is possible to monitor a subset of parameters that can be used for the determination of the respective QoS prediction in the network. These subsets can be disjoint among the entities, or can have independent observations of the same parameter. For instance, the client 100 observes the parameter A on its own, while the wireless network 300 has also an observation of the same parameter available locally (denoted by A'). After collecting the parameters locally, the subsets are passed to the respective prediction units in form of the determining means 110, 210, 320 within each entity in order to make a prediction of the QoS.

The results of the prediction units are shared among entities for further processing as depicted, where the QoS prediction QP #3 from the wireless network 300 is shared with the client 100.

The received predicted state from another entity can be then processed in several forms according to this invention report. Two possible variants are as follows:

According to an example, the prediction unit uses the predicted state(s) received from the different entit(ies) to validate its own prediction by means of evaluating the prediction confidence. If the prediction confidence is low, a new prediction is triggered. At each entity, a local action based on the prediction is made.

According to an example, the predicted states per entity are transmitted to a central entity like the apparatus 200 to make a new QoS prediction. Since the central unit has access to information from several entities, the reliability of the prediction is improved. The central entity uses the result from the central prediction unit to determine the actions to be performed, based on the prediction. For example, the central entity schedules uplink radio resources for transmitting data to the apparatus 300 based on the prediction from the determining means 210. The predicted state at the central prediction unit can be distributed back to the entities for local action decision.

The prediction units in form of the determining means 110, 210, 320 are distributed in the network and thus have different parameters available to use for the QoS prediction.

According to an example, a parameter is only available to a specific entity.

According to an example, the same type of parameter can be measured separately by different entities: For example, the RSSI is measured by the client and by the wireless network.

According to an example, the prediction units can share their predicted state with other prediction units to improve their prediction accuracy. The wireless network shares its prediction for latency, reliability and achievable data rate with the Client prediction unit to improve its prediction accuracy.

Figure 4:
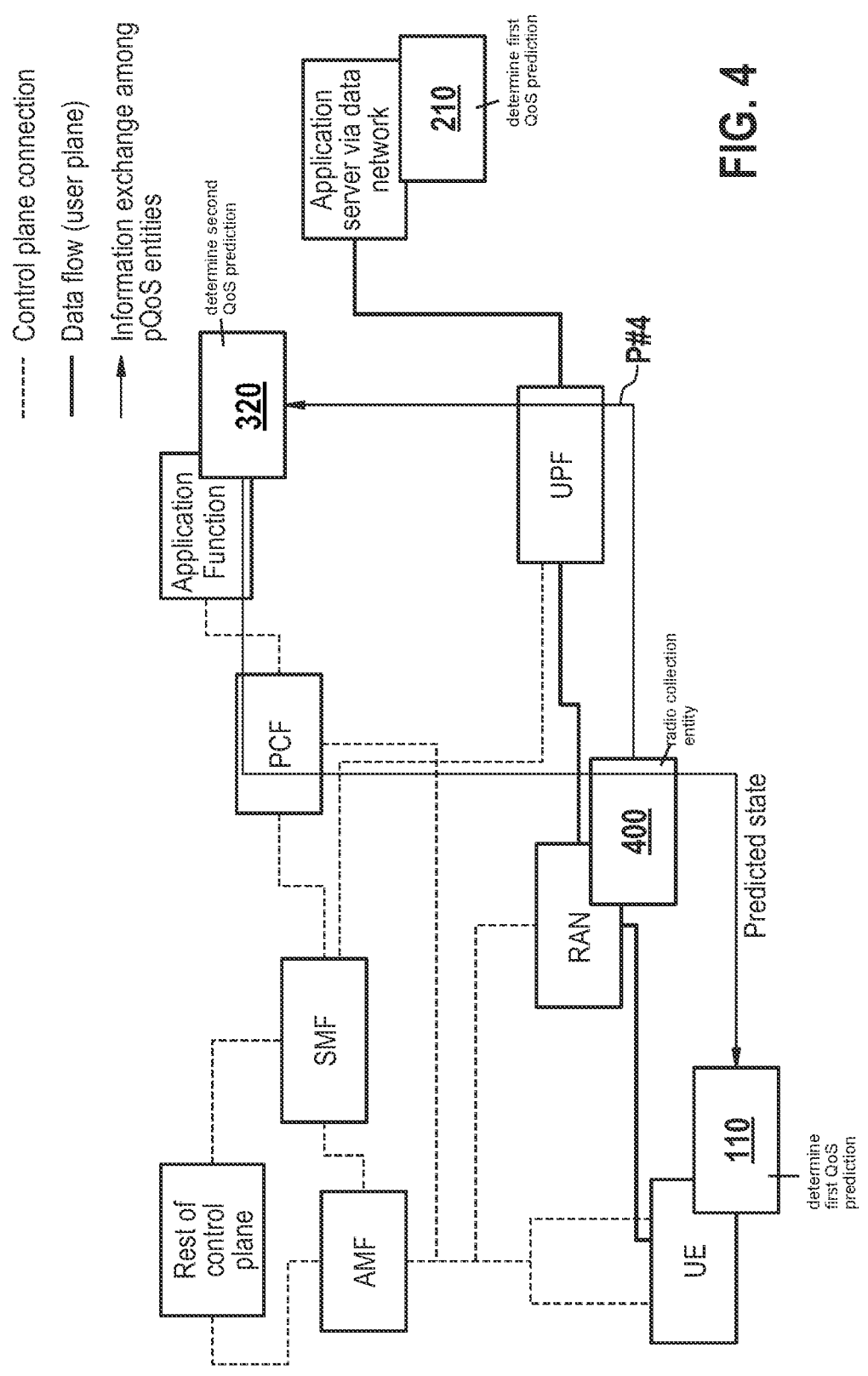
Figure 5:
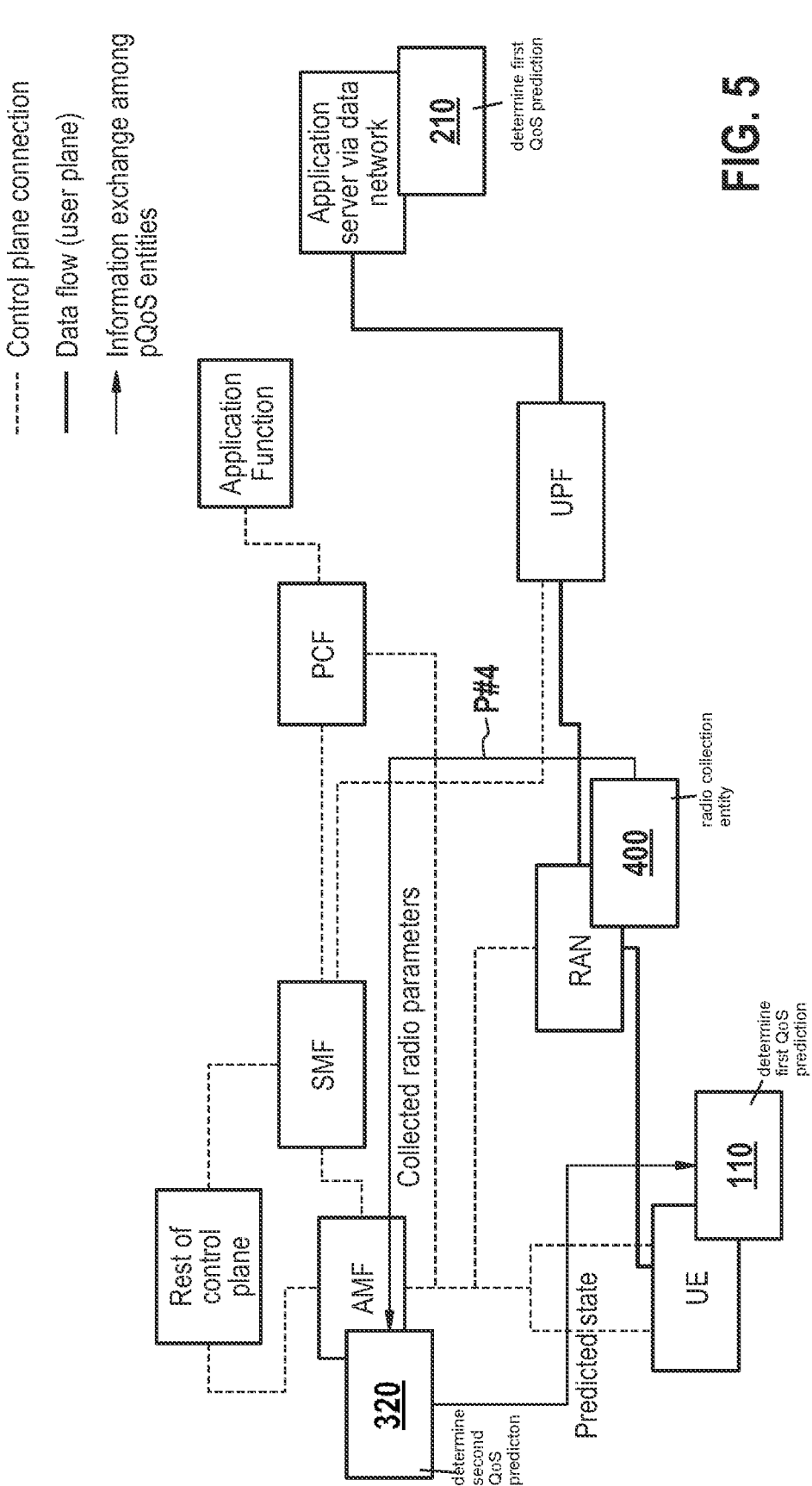

FIGS. 4 and 5 depict individual examples of a distribution of the determining means 110, 210, 320/the prediction units on the UE, on an external server and within the 3GPP control plane. Within the control plane the respective prediction unit could, e.g., be placed in the Application Function or in the 5G Core Access and Mobility Management Function, AMF. The latter has the advantage of direct interfaces to RAN and UE.

The prediction unit inside the 3GPP control plane is supported by a radio collection entity 400 placed in the radio access network, RAN, which has direct access to radio parameters P #4.

What is claimed is:

1. A method, comprising:
determining, by a first apparatus of a radio communications network, a present QoS parameter characterizing at least one of a present latency, a present data rate, and a present packet loss rate experienced at the first apparatus of the radio communications network;
determining, by the first apparatus, at least one first QoS prediction, the at least one first QoS prediction characterizing at least one of a future latency, a future data rate, and a future packet loss rate to be experienced at the first apparatus, the determination of the at least one first QoS prediction being based at least on the determined present QoS parameter; and
transmitting, by the first apparatus, the at least one first QoS prediction to a second apparatus that is configured to determine, based on the at least one first QoS prediction, a second QoS prediction, the at least one second QoS prediction characterizing the at least one of the future latency, the future data rate, and the future packet loss rate, but as to be experienced at the second apparatus, wherein the determination of the at least one first QoS prediction is performed using a subset of parameters locally available to the first apparatus, the subset being disjoint from parameters that the second apparatus is configured to use to determine the at least one second QoS prediction.

2. The method according to claim 1, further comprising:
receiving or determining at least one reference time indicator characterizing at least one point in time to which the at least one first QoS prediction is related.

3. The method according to claim 2, wherein the at least one first QoS prediction is further determined based on the first reference time indicator.

4. The method according to claim 2, wherein the at least one first QoS prediction is transmitted along with the first reference time indicator.

5. A first apparatus of a radio communications network, the first apparatus comprising:
a processor system having one or more processors, the processor system being configured to:
    determine at least one parameter characterizing a present QoS parameter characterizing at least one of a present latency, a present data rate, and a present packet loss rate experiences at the first apparatus of radio communications network; and
    determine at least one first QoS prediction, the at least one first QoS prediction characterizing at least one of a future latency, a future data rate, and a future packet loss rate to be experienced at the first apparatus, the determination of the at least one first QoS prediction being based at least on the determined present QoS parameter; and
a transmitter configured to transmit the at least one first QoS prediction to a second apparatus that is configured to determine, based on the at least one first QoS prediction, a second QoS prediction, the at least one second QoS prediction characterizing the at least one of the future latency, the future data rate, and the future packet loss rate, but as to be experienced at the second apparatus, wherein the determination of the at least one first QoS prediction is performed using a subset of parameters locally available to the first apparatus, the subset being disjoint from parameters that the second apparatus is configured to use to determine the at least one second QoS prediction.

6. A method, comprising:
receiving, by a second apparatus of a radio communications network, a first QoS prediction that characterizes a QoS that is predicted will be present at a first apparatus of the radio communications network, the prediction being based on a present QoS characterizing at least one present QoS parameter at the first apparatus;
determining, by the second apparatus, at least one parameter characterizing a present QoS that is currently at the second apparatus of the radio communications network; and
determining, by the second apparatus, at least one second QoS prediction that characterizes a future QoS that is predicted will be present in the future at the second apparatus based on the first QoS prediction received by the second apparatus from the first apparatus and based on the at least one parameter determined by the second apparatus, wherein the first QoS prediction is determined using a subset of parameters locally available to the first apparatus, the subset being disjoint from parameters used by the second apparatus to determine the at least one second QoS prediction, wherein the at least one present QoS parameter at the first apparatus comprises at least one of a present latency, a present data rate, and a present packet loss rate experienced at the first apparatus.

7. The method according to claim 6, further comprising:
receiving a plurality of other QoS predictions that each characterizes a future QoS at a respective other apparatus, wherein the determining of the at least one second QoS prediction is based additionally on the received plurality of other QoS predictions.

8. The method according to claim 6, further comprising:
transmitting the at least one second QoS prediction.

9. The method according to claim 6, further comprising;
determining at least one confidence level associated with the at least one second QoS prediction based on the received first QoS prediction.

10. The method according to the claim 9, further comprising:
triggering a further determination of the at least one second QoS prediction when the determined confidence level is below a confidence threshold.

11. The method according to claim 9, further comprising:
triggering an action in dependence on the second QoS prediction.

12. The method according to claim 9, further comprising:
triggering a starting operation of a service that communicates with at least one service served by another apparatus of the radio communications network, when the determined confidence level is above an action threshold.

13. The method according to claim 6, further comprising:
transmitting a reference time indicator related to at least one point in time and causing the first apparatus to determine the first QoS prediction referring to the at least one point in time.

14. The method as recited in claim 6, wherein the second QoS prediction includes a prediction of at least one of the following: a latency, a data rate, and a packet loss rate.

15. A second apparatus of a radio communications network, the second apparatus comprising:
a receiver with which the second apparatus is configured to receive at least one first QoS prediction that characterizes a QoS that is predicted will be present at a first apparatus of the radio communications network, the prediction being based on a present QoS characterizing at least one present QoS parameter at the first apparatus; and
a processor system having one or more processors, the processor system being configured to:
    determine at least one parameter characterizing a present QoS that is currently at the second apparatus of the radio communications network; and
    determine at least one second QoS prediction that characterizes a future QoS that is predicted will be present in the future at the second apparatus based on the at least one first QoS prediction received by the second apparatus from the first apparatus and based on the at least one parameter determined by the second apparatus, wherein the at least one first QoS prediction is determined using a subset of parameters locally available to the first apparatus, the subset being disjoint from parameters used by the second apparatus to determine the at least one second QoS prediction, wherein the at least one present QoS parameter at the first apparatus comprises at least one of a present latency, a present data rate, and a present packet loss rate experienced at the first apparatus.

16. A method, comprising:

determining, by a first apparatus of a radio communications network, a present QoS parameter characterizing at least one of a present latency, a present data rate, and a present packet loss rate experienced at the first apparatus of the radio communications network;

determining, by the first apparatus, at least one first QoS prediction, the at least one first QoS prediction characterizing at least one of a future latency, a future data rate, and a future packet loss rate to be experienced at the first apparatus, the determination of the at least one first QoS prediction being based at least on the determined present QoS parameter;

transmitting, by the first apparatus, the at least one first QoS prediction to a second apparatus of the radio communications network;

receiving, by the first apparatus, a second QoS prediction that:

characterizes the at least one of the future latency, the future data rate, and the future packet loss rate, as to be experienced at the second apparatus; and is generated by the second apparatus based on the at least one first QoS prediction that has been transmitted by the first apparatus to the second apparatus; and triggering, by the first apparatus and according to the received second QoS prediction, an action;

wherein the determination of the at least one first QoS prediction is performed using a subset of parameters locally available to the first apparatus, the subset being disjoint from parameters used by the second apparatus to determine the second QoS prediction.

17. The method as recited in claim 16, wherein the action is an initiating of a service performed by a third apparatus of the radio communications network.

18. The method of claim 16, wherein the triggering of the action comprises modifying a behavior of an application executing at the first apparatus in advance of the predicted future QoS at the second apparatus, the modifying being performed based on the received second QoS prediction.

19. The method of claim 16, wherein the triggering of the action comprises modifying a behavior of an application executing at the first apparatus in advance of the predicted future QoS at the first apparatus, the modifying being performed based on the first QoS prediction determined by the first apparatus.

* * * * *